(12) United States Patent
Wolf-Monheim

(10) Patent No.: US 10,836,226 B2
(45) Date of Patent: Nov. 17, 2020

(54) SEMI-TRAILING ARM SUSPENSION FOR A MOTOR VEHICLE

(71) Applicant: FORD GLOBAL TECHNOLOGIES, LLC, Dearborn, MI (US)

(72) Inventor: Friedrich Peter Wolf-Monheim, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 70 days.

(21) Appl. No.: 16/183,587

(22) Filed: Nov. 7, 2018

(65) Prior Publication Data

US 2019/0135065 A1 May 9, 2019

(30) Foreign Application Priority Data

Nov. 8, 2017 (DE) .......................... 10 2017 219 825

(51) Int. Cl.
| | | |
|---|---|---|
| *B60G 11/08* | (2006.01) | |
| *B60G 5/053* | (2006.01) | |
| *B60G 3/14* | (2006.01) | |
| *B60B 35/14* | (2006.01) | |

(Continued)

(52) U.S. Cl.
CPC .............. *B60G 5/053* (2013.01); *B60B 35/14* (2013.01); *B60G 3/145* (2013.01); *B60G 11/08* (2013.01); *B60G 13/005* (2013.01); *B60K 1/00* (2013.01); *B60G 2200/1322* (2013.01); *B60G 2200/24* (2013.01); *B60G 2200/422* (2013.01);

(Continued)

(58) Field of Classification Search
CPC .......... B60G 7/001; B60G 11/08; B60G 3/28; B60G 2206/7101; B60G 2200/141; B60G 2200/1422; B60G 2200/46; B60G 2202/114; B60G 2204/121; B60G 2204/143; B60G 2204/148; B60G 2204/82; B60G 2204/8302; B60G 2206/0114; B60G 2206/15
USPC .................................................. 280/124.128
See application file for complete search history.

(56) References Cited

U.S. PATENT DOCUMENTS

| | | | | |
|---|---|---|---|---|
| 5,918,692 A | * | 7/1999 | Sekita ...................... | B60G 3/14 180/56 |
| 8,556,282 B2 | * | 10/2013 | Pollmeyer ................ | B60G 3/10 280/124.107 |

(Continued)

FOREIGN PATENT DOCUMENTS

| | | |
|---|---|---|
| WO | 2009094973 A1 | 8/2009 |
| WO | 2014202301 A1 | 12/2014 |
| WO | 2016096293 A1 | 6/2016 |

*Primary Examiner* — Toan C To
(74) *Attorney, Agent, or Firm* — Raymond L. Coppiellie; Brooks Kushman P.C.

(57) ABSTRACT

An independent rear suspension of a motor vehicle with an electrical drivetrain. The independent rear suspension including a left semi-trailing arm and a right semi-trailing arm, each of which can be articulated with an end on the body side to a chassis of the motor vehicle and are fixedly connectable to a wheel carrier on an end on the wheel carrier side, and also a transverse leaf spring for the suspension of the rear wheels. The transverse leaf spring is attached on the end side to the ends of the semi-trailing arms on the wheel carrier side, so that between the semi-trailing arms and the transverse leaf spring is formed an open installation space for receiving at least part of the electrical drivetrain.

11 Claims, 1 Drawing Sheet

(51) Int. Cl.
*B60G 13/00* (2006.01)
*B60K 1/00* (2006.01)

(52) U.S. Cl.
CPC .... *B60G 2202/114* (2013.01); *B60G 2300/50* (2013.01); *B60K 2001/001* (2013.01)

(56) References Cited

U.S. PATENT DOCUMENTS

| | | | | |
|---|---|---|---|---|
| 2011/0227310 A1* | 9/2011 | Pollmeyer | ................ | B60G 3/02 280/124.145 |
| 2013/0341882 A1* | 12/2013 | Ehrlich | .................... | B60G 3/00 280/124.128 |
| 2015/0123371 A1* | 5/2015 | Lee | ..................... | B60G 21/052 280/124.128 |
| 2015/0123372 A1* | 5/2015 | Lee | ......................... | B60G 7/00 280/124.128 |
| 2015/0191070 A1* | 7/2015 | Raymond | ................ | B60G 3/14 280/124.128 |
| 2019/0143774 A1* | 5/2019 | Gerhards | ................ | B60G 3/14 280/124.128 |

\* cited by examiner

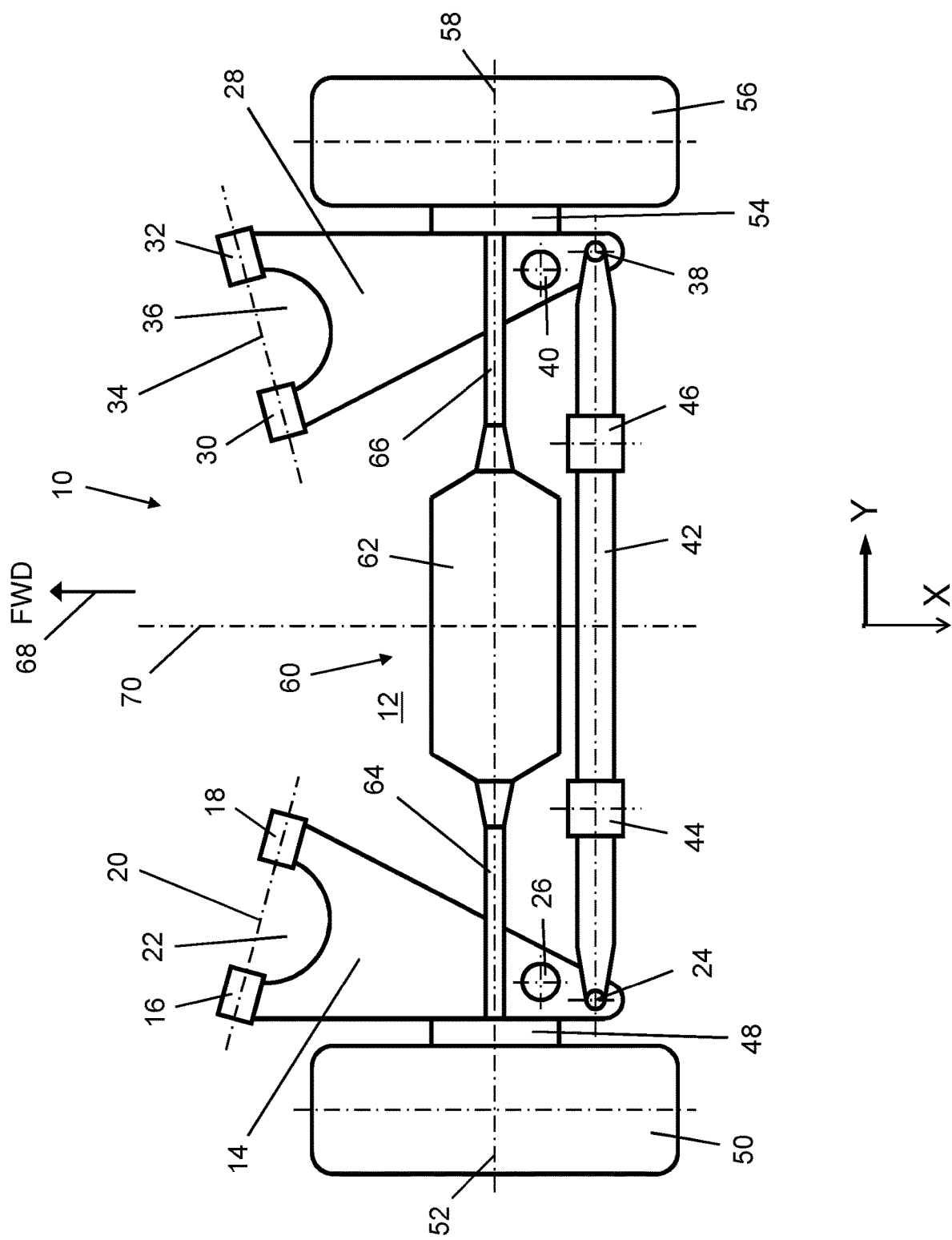

SEMI-TRAILING ARM SUSPENSION FOR A MOTOR VEHICLE

CROSS-REFERENCE TO RELATED APPLICATIONS

This application claims foreign priority benefits under 35 U.S.C. § 119(a)-(d) to DE Application 10 2017 219 825.7 filed Nov. 8, 2017, which is hereby incorporated by reference in its entirety.

TECHNICAL FIELD

The invention relates to an independent rear suspension of a motor vehicle exhibiting a left semi-trailing arm and a right semi-trailing arm and also a transverse leaf spring for suspension of the rear wheels. The disclosed suspension is well-adapted for use with an electric drivetrain. The invention also relates to a motor vehicle having an electrical drivetrain and an independent rear suspension of this kind.

BACKGROUND

In the field of vehicle technology, a wide variety of different suspensions for motor vehicle wheels are known in the state of the art. A particular distinction can be made between the independent suspension predominantly used nowadays in passenger vehicles and the rigid axle suspension mainly used with the rear axles of commercial vehicles. In addition, however, there are also so-called semi-rigid axles in which the wheels of an axle provided on both sides or else the wheel carriers thereof are attached to two trailing arms which are pivotably connected to the vehicle body, normally to the chassis, at an end on the body side.

The semi-trailing arm axle known in the art is a special embodiment of the independent suspension frequently used in which motor vehicles as the suspension of a rear axle. The semi-trailing arm axle comprises in principle triangular semi-trailing arms which are fixedly connected to a wheel carrier and are mounted movably, for example pivotably, on the vehicle body.

For example, US 2011/0227310 A1 describes a semi-trailing arm axle for a motor vehicle which has for each wheel of the axle a semi-trailing arm which is flexible about a vertical axis and which is attached via at least one bearing to the vehicle body or to an auxiliary frame. In this case, each wheel of the axle is connected to the respective flexible semi-trailing arm via at least one wheel bearing, as a result of which the flexible semi-trailing arm is the only wheel-guiding element.

In a described embodiment, at least one transverse leaf spring connected to the semi-trailing arm or to a wheel carrier is provided and for each suspension at least one shock absorber connected to the flexible semi-trailing arm or to the wheel carrier.

It is also known from the state of the art for transverse leaf springs to be used in suspensions, in particular in rear suspensions. The transverse leaf spring in this case may assume one or more functions of a stabilizer, a spring and a wheel-guiding transverse control arm.

Hence, for example, WO 2009/094973 A1 describes an axle suspension, in particular a rear axle suspension, for a vehicle with a first trailing arm fixedly connected to a first wheel carrier, which trailing arm is articulated by means of a first bearing to a body of the vehicle. In addition, the axle suspension comprises a second trailing arm fixedly connected to a second wheel carrier, which trailing arm is articulated by means of a second bearing to the body. In this way, the trailing arms are pivotable about a pivot axis relative to the body. Furthermore, the axle suspension contains a first vehicle wheel rotatably mounted on the first wheel carrier and a second vehicle wheel rotatably mounted on the second wheel carrier. In this way, the two trailing arms are connected to one another by means of a transverse connection which, when viewed from the bearings, is rotatably mounted on the trailing arms behind the center of the wheels.

In a described embodiment, the transverse connection is configured as a leaf spring and, in particular, as a leaf spring made of glass fiber-reinforced plastic (GFP) which is mounted or supported on the body between the two trailing arms. The transverse leaf spring may adopt a wheel-guiding function.

In addition, WO 2014/202301 A1 describes a suspension for a motor vehicle. The suspension comprises two wheel carriers arranged opposite one another in the transverse vehicle direction, which wheel carriers are each connectable in an articulated manner to a body designed for this purpose via at least one wheel-guiding control arm. In addition, the suspension contains a transverse leaf spring extending between these two wheel carriers which is mounted for the compression and rebound of the wheel carriers in the region between their two ends spaced apart therefrom and is connected in the region of their ends to the wheel carrier assigned in each case. According to the invention, the wheel-guiding control arm is arranged in a lower control arm plane and the transverse leaf spring is arranged in a control arm plane above the lower control arm plane in the vertical vehicle direction. Through an axle design with a wheel guide through a transverse leaf spring, a number of components can be reduced and the axle can thereby have a favorable design overall with respect to its weight and cost.

In particular, the use of the transverse leaf spring means that additional control arms are unnecessary and in this way sufficient installation space for a solution can be created in which the wheel carriers are connectable to a drive unit, wherein the drive unit may be configured as a wheel hub motor or an electric motor and/or a combustion engine.

Furthermore, WO 2016/096293 A1 describes a rear suspension for a motor vehicle. The rear suspension comprises a wheel carrier that can pivot about a steering axle for receiving a wheel in a steerable manner, a wheel-guiding control arm which is arranged in a lower control arm plane in relation to the vertical axis of the vehicle and which can be connected in an articulated manner on the body side to a body provided therefor and connected in an articulated manner on the wheel side to the wheel carrier, a wheel-guiding transverse link arranged in an upper control arm plane which can be connected in an articulated manner on the body side to the body provided therefor and is connected in an articulated manner on the wheel side to the wheel carrier, and a transverse leaf spring having a two-point bearing on the body side, which transverse leaf spring is connected in an articulated manner at its end facing the wheel carrier to said wheel carrier behind the wheel center in relation to the direction of travel.

The transverse control arm is arranged in front of the transverse leaf spring in the direction of travel and the transverse leaf spring is connected in an articulated manner to the wheel carrier below the transverse link in the vertical direction of the vehicle, such that the transverse leaf spring is designed as a toe-control link for passive steering of the wheel via the wheel hub. The transverse leaf spring therefore combines three important functions of a rear suspension in a single component, namely that of the suspension, stabilizer, and toe link. Consequently, the rear suspension is optimally suitable for a driven rear wheel axle, in particular using conventional drive technology or, however, also with an electrical drive, preferably a wheel hub motor.

In view of the disclosed state of the art, the field of rear suspensions still offers scope for improvement in relation to electrically driven rear wheels.

The problem addressed by the invention is that of providing a compact rear suspension for an electrically drivable motor vehicle which allows a high level of driving comfort.

SUMMARY

According to the invention, the problem is solved by a rear suspension having the features of claim 1. The problem is further solved by a motor vehicle according to claim 8. Further, particularly advantageous embodiments of the invention are disclosed by the dependent claims in each case.

It should be pointed out that the features and measures listed individually in the following description can be combined with one another in any technically feasible manner to disclose further embodiments of the invention. The description characterizes and specifies the invention, particularly, in addition, in connection with the FIGURES.

The independent rear suspension of a motor vehicle according to the invention with an electrical drivetrain has a left semi-trailing arm and a right semi-trailing arm, each of which can be articulated with an end on the body side to a chassis of the motor vehicle and are fixedly connectable to a wheel carrier on an end on the wheel carrier side, and also a transverse leaf spring for the suspension of the rear wheels.

In this case, the transverse leaf spring is attached on the end side to the ends of the semi-trailing arms on the wheel carrier side, so that between the semi-trailing arms and the transverse leaf spring is formed an open installation space for receiving at least part of the electrical drivetrain.

A "motor vehicle" within the meaning of this invention should be understood to mean, in particular, a passenger vehicle, a heavy goods vehicle, an articulated truck or a coach.

A high level of driving comfort can be achieved through the independent rear suspension according to the invention. At the same time, with a suitable embodiment an installation space optimized for receiving at least part of the electrical drive can be supplied.

Since the semi-trailing arm is fixedly connectable to the wheel carrier at its end on the wheel carrier side, as an alternative to the attachment of the transverse leaf spring at the ends on the wheel carrier side, the transverse leaf springs are also fixedly connected to the wheel carriers at one end.

The transverse leaf spring is preferably secured with a central region to the chassis of the motor vehicle. The transverse leaf spring in this case may be arranged in such a manner that it has an upwardly convex shape in a state of the independent rear suspension only statically loaded with the chassis load in the vertical direction. The transverse leaf spring may, however, also be configured in such a manner that it extends in this state substantially in a plane which is arranged parallel to a road surface.

In preferred embodiments, the positions of the attachment between the transverse leaf spring and the semi-trailing arms are spaced apart from rotational axes of the rear wheels in a backwards direction. In this way, it can be achieved that the open installation space comprises regions close to the wheel axle which are particularly important when it comes to receiving at least part of the electric drive.

The attachment of the transverse leaf spring to the ends of the semi-trailing arms on the wheel carrier side is guided past by means of at least one substantially vertically oriented connecting rod or a vertical shearing cushion unit. In this way, regions close to the wheel axle for receiving at least part of the electrical drive can be kept free in the vertical direction too.

A "coupling rod" (also: "coupling") within the meaning of this invention should be understood to mean a straight, usually metallic rod or pin, at the ends of which fastening elements are mounted in an articulated manner, for example using rubber bearings. Coupling rods can only transmit forces in a longitudinal direction. In this way, a vertical interval between the semi-trailing arm and the adjacent attached end of the oblique leaf spring is fixed; lateral movements (in a plane perpendicular to the axis of the coupling rod) are made possible, however, to a predefined extent. Coupling rods are widespread in vehicle technology and are used, for example, for fastening stabilizers (torsion bar springs). A similar function can be achieved by the vertical shearing cushion unit which may contain rubber-elastic materials, for example, which are stretched under the effects of transverse forces.

If the ends of the semi-trailing arms on the wheel carrier side are arranged below the rotational axes of the rear wheels and the ends of the semi-trailing arms on the body side are arranged above the rotational axes, regions close to the wheel axle which are also arranged close to the wheel can be made available as an open installation space.

In preferred embodiments, the ends of the semi-trailing arms on the body side are configured in fork form and are fitted with two separate bushings for articulation to the chassis of the motor vehicle. In this way, with a suitable configuration, recesses can be provided in the transverse control arms, as a result of which a weight reduction can be achieved in the unsprung mass of the motor vehicle while the intended function of the semi-trailing arms is maintained.

Means for attaching a damping element are preferably provided at each end of the semi-trailing arms on the wheel carrier side. Through the close attachment of a damping element at each end of the transverse leaf spring, effective damping of excited vibrations can be achieved. The damping elements are preferably configured as shock absorbers.

In preferred embodiments, the transverse leaf spring comprises a predominant proportion of a composite plastic. In this way, a transverse leaf spring can be supplied in lightweight construction with a particularly large weight reduction by comparison with conventional transverse leaf springs made of steel.

The term "a predominant proportion" should be understood within the meaning of the invention to refer, in particular, to a proportion of more than 50% by vol., preferably of more than 70% by vol., and, particularly preferably, of more than 90% by vol. In particular, the term should include the possibility that the transverse leaf spring is made completely, i.e. 100% by vol., of a composite material.

The composite material may, for example, be realized as a fiber-reinforced plastic (FRP). In particular, the composite material may comprise a carbon-fiber-reinforced plastic (CFP), a glass-fiber-reinforced plastic (GFP) and/or an aramid-fiber-reinforced plastic (AFP).

In a further aspect of the invention, a motor vehicle is proposed which comprises an electrical drivetrain containing an electric motor and two stub shafts. In addition, the motor vehicle is equipped with an independent rear suspension according to the invention. In this case, the electric motor is arranged in the open installation space between the semi-trailing arms and the transverse leaf spring and each of the two stub shafts is operatively connected to one of the rear wheels of the motor vehicle.

The term "operatively connected" within the meaning of this invention should be understood to mean, in particular, that operatively connected objects are connected to one another mechanically in such a way that a transmission of a force and/or of a torque and/or of a torsional moment between the objects is possible. The transmission in this case may take place both through direct contact and also indirectly, through an intermediate element.

The advantages described in connection with the proposed independent rear suspension are fully transferrable to a motor vehicle of this kind.

In preferred embodiments of the motor vehicle, the electric motor is arranged in a central region of the open installation space and the two stub shafts are arranged flush with the rotational axis of one of the rear wheels, starting from either side of the electric motor.

In this way, short, effective transmission paths for the moment of force or torque of the electric motor to the rear wheels can advantageously be achieved, as a result of which with a suitable embodiment, components can also be saved.

The electric motor is preferably secured to the chassis of the motor vehicle, as a result of which the unsprung mass of the motor vehicle can be kept low.

Further advantageous embodiments of the invention are disclosed in the dependent claims and the following description of the FIGURE. In the drawing:

BRIEF DESCRIPTION OF THE DRAWINGS

FIG. 1 shows a schematic representation of an independent rear suspension of a motor vehicle according to the invention with an electrical drivetrain in an installation state in plan view.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 shows a schematic plan-view representation of an exemplary embodiment of an independent rear suspension 10 of a motor vehicle with an electrical drivetrain 60. A forward driving direction 68 of the motor vehicle is shown in FIG. 1.

The independent rear suspension 10 has a left semi-trailing arm 14 and a right semi-trailing arm, each having an outer shape that substantially corresponds to the shape of a tapered equilateral triangle. The semi-trailing arms 14, 28 may be made of steel or other high-strength materials, wherein light metal alloys or composite materials, also fiber-reinforced plastics, are contemplated.

Each of the two semi-trailing arms 14, 28 has a first or forward end (corresponding to the base of the equilateral triangle) which is articulated to an auxiliary carrier (not shown) of the motor vehicle or directly to the chassis, frame, or sub-frame (not shown) of the motor vehicle. The first or forward ends of the semi-trailing arms 14, 28 are generally fork-shaped and are each is fitted with two separate bushings 16, 18, 30, 32 for articulating connection to the vehicle, so that the left semi-trailing arm 14 is pivotably mounted about a left pivot axis 20 oriented obliquely relative to the vehicle longitudinal axis (X-axis) and the right semi-trailing arm 28 is pivotably mounted about a right pivot axis 34 oriented obliquely relative to the vehicle longitudinal axis (X-axis). Between its two bushings 16, 18, 30, 32 each of the semi-trailing arms 14, 28 may be define a recess 22, 36 (circular segment-shaped in the depicted embodiment) for weight saving.

A left wheel carrier 48 is fixedly connected to the left semi-trailing arm 14 adjacent to a rear end thereof. In the manner of a mirror image, a right wheel carrier 54 is fixedly connected to the right semi-trailing arm 28 adjacent to a rear end thereof. In this way, the left rear wheel 50, the left wheel carrier 48, and the left semi-trailing arm 14 attached to the left wheel carrier 48 are mounted pivotably about the left pivot axis 20 and independently of the right rear wheel 56 which is attached to the right wheel carrier 54 and is pivotably mounted along with the right semi-trailing arm 28 about the right pivot axis 34.

The left rear wheel 50 and the right rear wheel 56 are attached in a manner known in the art to the corresponding wheel carrier 48, 54, such that the wheels 50, 56 are rotatably mounted about a left rotational axis 52 and a right rotational axis 58 respectively.

In a state wherein the independent rear suspension 10 is loaded only with the static vehicle weight, the rear ends of the semi-trailing arms 14, 28 are disposed below the rotational axes 52, 58 of the rear wheels 50, 56 and the first or forward or body-attachment ends of the semi-trailing arms 14, 18 are disposed above the rotational axes 52, 58.

The independent rear suspension 10 according to the invention further comprises a transverse leaf spring 42. The transverse leaf spring 42 may advantageously comprise a predominant proportion of more than 95% by vol. of a composite material, made of a fiber-reinforced plastic in this special embodiment. The fiber-reinforced plastic may be realized as a glass-fiber-reinforced epoxy resin (GRE). The transverse leaf spring 42 in the installation state depicted in FIG. 1 in a vertical plane (YZ plane) which is arranged perpendicularly to the straight-ahead direction of travel 68. The transverse leaf spring 42 may have a substantially rectangular cross section which varies along its length, as required to achieve a predetermined spring characteristic curve.

The transverse leaf spring 42 is fixedly connected to the chassis of the motor vehicle, for example by means of two spring clips 44, 46 disposed on either side of a center axis 70 of the motor vehicle.

The outboard left and right ends of the transverse leaf spring 42 are attached to the semi-trailing arm 14, 28. The attachment between the transverse leaf spring 42 and the semi-trailing arms 14, 28 is located rearwardly (along the vehicle longitudinal axis or X-axis) of the respective rear wheel rotational axes 52, 58. The attachments between the opposite/outboard ends of the transverse leaf spring 42 and the respective left and right semi-trailing arm 14, 28 is effected by means of two couplings 24, 38, the which are screwed or otherwise attached to the respective end of the transverse leaf spring 42 and the semi-trailing arm 14, 28. The couplings 24, 38 permit relative movements (within predefined limits) between the ends of the transverse leaf spring 42 and the respective semi-trailing arms 14, 28 in the XY plane (horizontal, assuming the vehicle is sitting on a level surface). In this way, the second/rear ends of the semi-trailing arms 14, 28 are connected, via the leaf spring 42, in a sprung manner to the chassis of the motor vehicle.

Shock absorbers 26, 40 are operatively connected at their lower ends to the respective semi-trailing arms 14, 28 and extend generally upward (along the vehicle Z-axis), with upper ends of the shock absorbers attached to the vehicle chassis or body (not shown) in a manner well known in the art. The shock absorbers 26, 40 may (as shown) make contact with and act on the semi-trailing arms at locations relatively close to the respective locations 24, 38 where the leaf spring is connected to the semi-trailing arms.

As can be seen from FIG. 1, the left semi-trailing arm 14, the right semi-trailing arm 28, and the transverse leaf spring 42 are arranged in such a manner that an open installation space 12 is defined between those components. The open installation space 12 is ideally located to receiving part of the electrical drivetrain 60 of the motor vehicle which may be located directly between the left and right semi-trailing arms 14, 48 and in alignment with the wheel rotational axes 52, 58. In this context, "in alignment with" may mean in coaxial alignment with the axes or it may mean somewhat above or below the axes.

The electrical drivetrain 60 of the motor vehicle generally comprises, among other things, an electric motor 62 and a left stub shaft 64 and a right stub shaft 66 which may advantageously be configured as articulation shafts. The electric motor 62 may have an elongate form and be arranged transversely (parallel with the vehicle Y-axis) in the open installation space 12, most optimally in a central region thereof, between the semi-trailing arms 14, 28 and forward of the transverse leaf spring 42, and be secured to the chassis of the motor vehicle. The motor 62 is therefore located on or in alignment with the left and right wheel rotational axes 52, 58. Each of the stub shafts 64, 66 may optimally be disposed generally co-axially with its respective rear wheel rotational axis 52, 58, starting from either transverse side of the electric motor 62, when the independent rear suspension 10 is a state wherein it is only statically loaded with the vehicle body load. The two stub shafts 64, 66 are, as is well known in the art, operatively connected to one of the rear wheels 50, 56 for transmission of drive and/or regenerative braking torque. The articulation shafts permit the necessary degree of movements of the rear wheels 50, 56 relative to the electric motor 62 during operation of the motor vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A motor vehicle, comprising
    a left and a right semi-trailing arm, each pivotally attached to a chassis of the vehicle and extending rearwardly therefrom;
    a left and a right wheel carrier mounted to the left and right semi-trailing arms respectively, the wheel carriers defining respective wheel rotational axes;
    a transverse leaf spring attached to/between the respective first and second semi-trailing arms at respective points rearward of the respective wheel rotational axes; and
    an electric motor fastened to the chassis of the motor vehicle and located forward of the leaf spring between the left and right wheel carriers and in alignment with the wheel rotational axes.

2. The motor vehicle of claim 1, wherein left and right stub shafts extend from left and right sides of the electric motor and are coaxial with the respective wheel rotational axes.

3. The motor vehicle of claim 1, further comprising a left and a right shock absorber attached to the respective semi-trailing arm.

4. The motor vehicle of claim 3, wherein the shock absorbers act on the respective semi-tailing arms at respective locations forward of respective attachment points of the leaf spring to the semi-trailing arms.

5. A vehicle suspension, comprising:
    left and right semi-trailing arms attached to a vehicle chassis at respective pivot axes and extending rearwardly from the pivot axes;
    left and right wheel carriers mounted to the respective semi-trailing arms and defining respective wheel rotational axes;
    a transverse leaf spring having left and right ends attached to the respective semi-trailing arms at points rearward of the respective wheel rotational axes; and
    an electric motor fixed to the chassis and located forward of the leaf spring between the left and right wheel carriers and in alignment with the wheel rotational axes.

6. The suspension of claim 5, further comprising a left and a right shock absorber attached to the respective semi-trailing arm.

7. The suspension of claim 6, wherein the shock absorbers act on the respective semi-trailing arms at respective locations forward of respective attachment points of the leaf spring to the semi-trailing arms.

8. The suspension of claim 5, wherein left and right stub shafts extend from left and right sides of the electric motor and are coaxial with the respective wheel rotational axes.

9. A vehicle suspension, comprising:
    left and right semi-trailing arms, each having a forward end pivotally attached to a vehicle chassis;
    a transverse leaf spring having opposite ends attached to the respective semi-trailing arms adjacent rear ends thereof; and
    left and right wheel carriers mounted to the respective semi-trailing arms and defining respective wheel rotational axes forward of the leaf spring, the wheel carriers having respective left and right wheels rotatably mounted thereto; and
    an electric motor fastened to the chassis and located forward of the leaf spring between the left and right wheel carriers and in alignment with the wheel rotational axes, wherein left and right articulation shafts extend from left and right sides of the electric motor and provide power to the respective left and right wheels.

10. The suspension of claim 9, further comprising a left and a right shock absorber attached to the respective semi-trailing arm.

11. The suspension of claim 10, wherein the shock absorbers act on the respective semi-tailing arms at respective locations forward of respective attachment points of the leaf spring to the semi-trailing arms.

\* \* \* \* \*